United States Patent [19]

Snell

[11] Patent Number: 5,289,732
[45] Date of Patent: Mar. 1, 1994

[54] COLUMN-MOUNTED SHIFT CONTROL ASSEMBLY

[75] Inventor: William M. Snell, Grand Blanc, Mich.

[73] Assignee: Chrysler Corporation, Highland Park, Mich.

[21] Appl. No.: 996,470

[22] Filed: Dec. 24, 1992

[51] Int. Cl.⁵ .................. F16H 59/02; F16H 1/06; G05G 5/18
[52] U.S. Cl. .................. 74/473 SW; 74/475; 267/155
[58] Field of Search .......... 74/473 SW, 475; 267/155

[56] References Cited

U.S. PATENT DOCUMENTS

| | | | |
|---|---|---|---|
| 4,078,447 | 3/1978 | Kato et al. | 74/475 |
| 4,304,112 | 12/1981 | Osborn | 74/475 X |
| 4,365,522 | 12/1982 | Kubota et al. | 74/475 |
| 4,474,085 | 10/1984 | DeVogelaere et al. | 74/475 X |
| 4,805,476 | 2/1989 | Beauch et al. | 74/473 SW |
| 4,821,605 | 4/1989 | Dzioba | 74/850 |
| 4,934,208 | 6/1990 | Carlstrom | 74/473 SW |
| 4,966,044 | 10/1990 | Bowman et al. | 74/473 SW X |
| 5,035,156 | 7/1991 | Roble | 74/850 |
| 5,079,966 | 1/1992 | Ishizuki et al. | 74/475 |

Primary Examiner—Allan D. Herrmann
Attorney, Agent, or Firm—Edward P. Barthel

[57] ABSTRACT

A column-mounted shift control assembly includes an integral gate and mounting bracket, a shift lever unit rotatably mounted on the bracket, a shift handle pivotally mounted on the shift lever unit, and resilient means for urging the terminal end of the shift handle toward the bracket. The latter includes a planar gate portion having detents formed on an edge thereof for selective cooperation with the shift handle terminal end to select a desired transmission shift position.

4 Claims, 3 Drawing Sheets

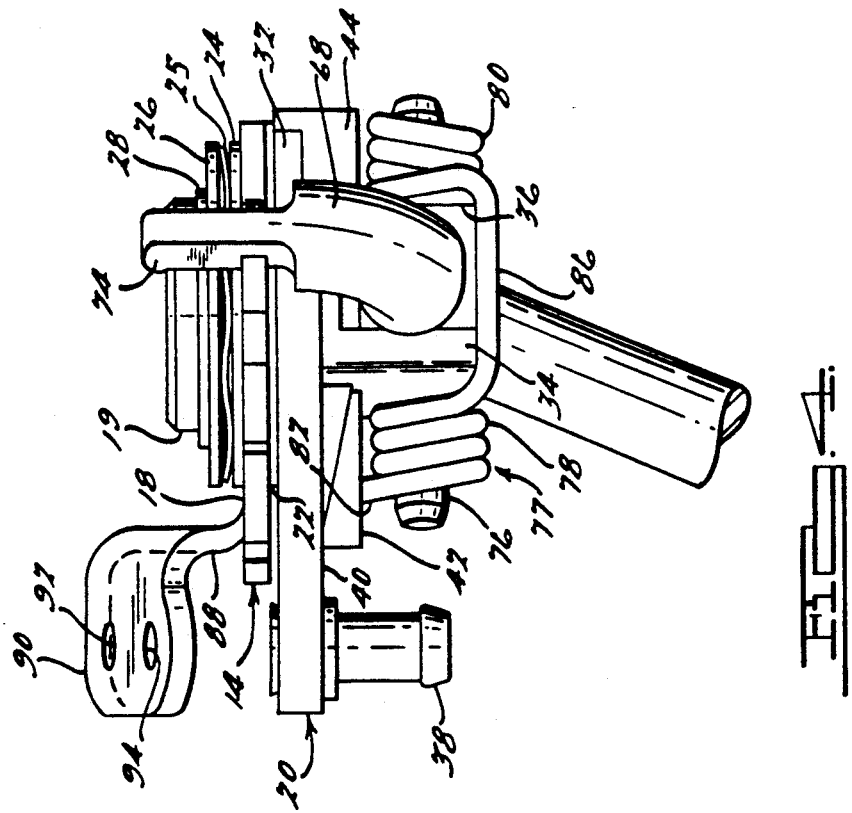

COLUMN-MOUNTED SHIFT CONTROL ASSEMBLY

TECHNICAL FIELD

This invention relates generally to vehicle transmission shift control assemblies and, more particularly, to column-mounted shift control arrangements.

BACKGROUND ART

Heretofore, column-mounted vehicle transmission shift control assemblies have generally included arcuate-shaped gate brackets having the various forward, reverse, and park recesses or detents formed along a side edge thereof. For example, see Carlstrom U.S. Pat. No. 4,934,208, and Dzioba U.S. Pat. No. 4,821,605. In such an arrangement, the gate and mounting bracket are separate stampings, requiring additional design tolerances and costs. Additionally, the curved gate, when heat treated, may become distorted, making tolerances difficult to hold.

Floor-mounted shift control assemblies are known to embody planar gate brackets, with detents formed on an edge of an opening formed therethrough, for example: Kubota et al U.S. Pat. No. 4,365,522; Ishizuki et al U.S. Pat. No. 5,079,966; DeVogelaere et al U.S. Pat. No. 4,474,085; Roble U.S. Pat. No. 5,035,156; and Osborn U.S. Pat. No. 4,304,112.

A floor-mounted shift control assembly embodying a planar gate bracket, with detents formed on an outer edge thereof, is disclosed in Kato et al U.S. Pat. No. 4,078,447.

DISCLOSURE OF THE INVENTION

A general object of the invention is to provide an improved column-mounted vehicle transmission shift control assembly.

Another object of the invention is to provide a column-mounted transmission control assembly wherein the gate bracket is planar, with detents provided on an upper edge, rather than being arcuate-shaped, with detents provided on a side edge.

A further object of the invention is to provide a column-mounted transmission control assembly wherein the gate and mounting bracket is formed on an integral stamped component.

These and other objects and advantages will become more apparent when reference is made to the following drawings and the accompanying description.

BRIEF DESCRIPTION OF THE DRAWINGS

FIG. 4 is an end view taken long the plane of the line 4—4 of FIG. 3, and looking in the direction of the arrows; and FIG. 5 is a view similar to FIG. 3, but illustrating a different operational condition.

BEST MODE OF CARRYING OUT THE INVENTION

Figure 1:
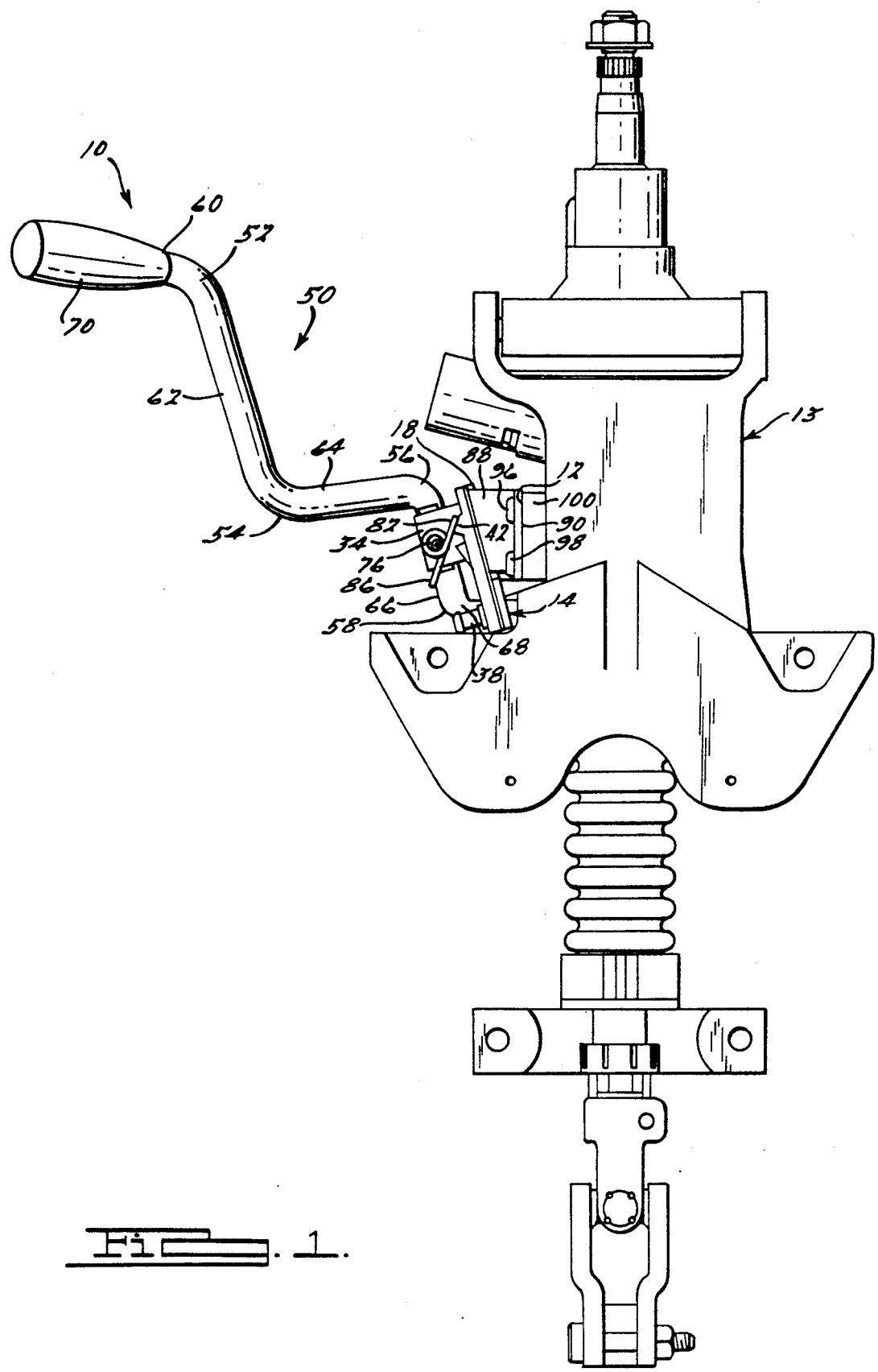
FIG. 1 is front view of a vehicle steering column embodying the invention.
Figure 2:
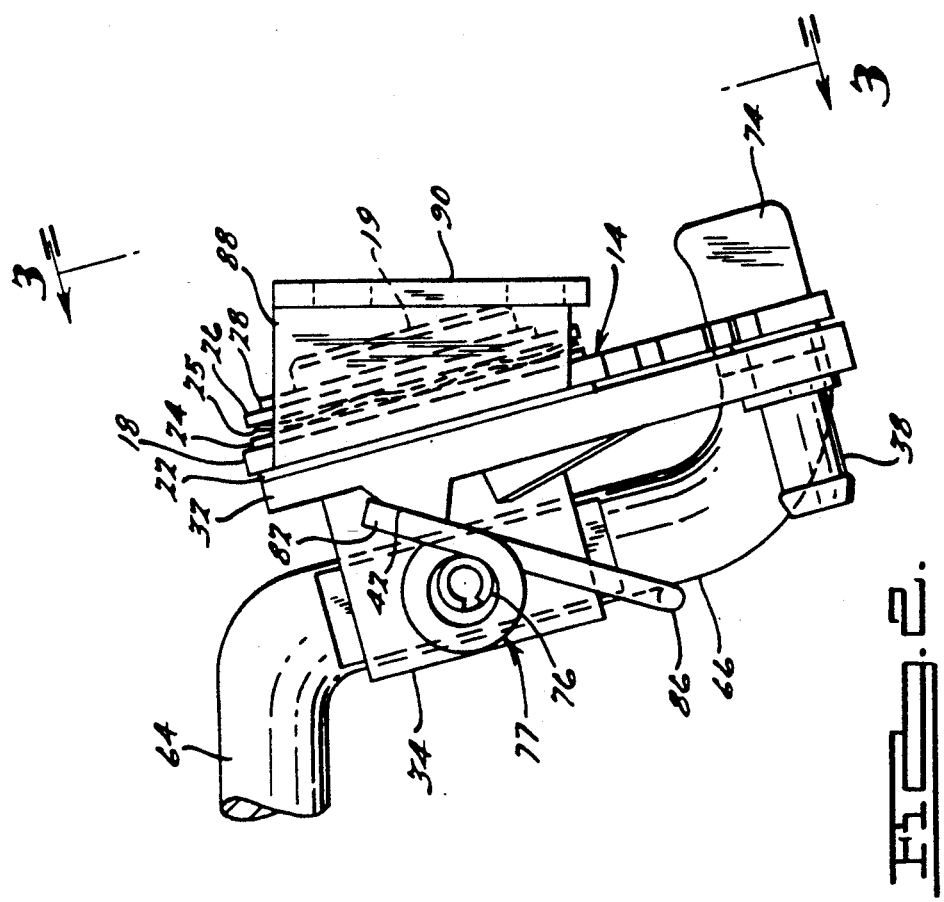
FIG. 2 is an enlarged end view of a portion of the FIG. 1 structure.

Referring now to the drawings in greater detail, FIGS. 1-5 illustrate a vehicle gear shift mechanism 10 mounted on a predetermined surface 12 of a steering column 13 (FIG. 1). The gear shift mechanism 10 includes an integral gate and mounting bracket 14 having a mounting opening 16 formed in a planar body portion 18, and mounted around a cylindrical hub 19 extending from a shift lever unit 20. As shown in FIGS. 2 and 4, the planar body portion 18 is confined between two wear washers 22 and 24. A wave washer 25 is confined between the wear washer 24 and a flat steel washer 26. The planar body portion 18 is retained on the hub 19 by the washer 24/25/26 arrangement which, in turn, is retained on the hub 19 by a C-clip 28 mounted in an annular groove 30 (FIG. 3) formed adjacent the distal end of the hub 19.

The wear bushing 22 abuts against a partially round body portion 32 (FIGS. 3 and 5) of the shift lever unit 20. A pair of spaced-apart mounting flanges 34 and 36 (FIGS. 3–5) are formed on the body portion 32, on the side opposite the wear bushing 22, so as to extend perpendicularly therefrom.

A shift cable mounting lug 38 is provided adjacent the end of an elongated extension 40 (FIGS. 3 and 5) of the body portion 32. A pair of spring retainer abutments 42 and 44 are formed on the body portion 32, extending outwardly from the respective flanges 34 and 36. A pair of aligned openings 46 and 48 are formed through a central portion of the respective flanges 34 and 36.

A shift handle 50 includes bend portions 52, 54, 56, and 58 formed along its length to provide segments 60, 62, 64, 66, and 68. A hand grip 70 is provided on the first end segment 60, and a hole 72 (FIGS. 3 and 5) is formed through the segment 66. A flat-sided terminal end 74 is formed on the distal end of the segment 68, for a purpose to be described.

A spring mounting pin 76 is extended through the opening 46, the hole 72, and the opening 48. A spring assembly 77 (FIG. 4) includes a pair of coil springs 78 and 80 mounted around the respective extended ends of the pin 76. An outer end coil 82 and 84 of the respective coil springs 78 and 80 is straightened to abut against the respective spring retainer abutments 42 and 44, and a central U-shaped wire portion 86 extends from the respective inner coils of the springs 78 and 80. The U-shaped wire portion 86 is urged in tension against the outer surface of the shift handle segment 66 (FIGS. 2 and 4) by the abutting outer straightened coils 82 and 84, for a purpose to be described.

The integral gate and mounting bracket 14 is formed to include a segment 88 (FIGS. 2 and 4) bent outwardly from the planar body portion 18, with a mounting flange 90 bent substantially perpendicularly from the outer end of the segment 88. A pair of mounting holes 92 and 94 are formed through the flange 90. A pair of metal screws 96 and 98 (FIG. 1) are mounted through the holes 92 and 94 to secure the gear shift mechanism 10 to a mounting block 100 (FIG. 1) on the steering column 12.

A plurality of gate detents 102, 104, 106, and 108 (FIGS. 3 and 5), corresponding to Drive, First, and Reverse gear shift positions, respectively, are formed on an edge of the planar body portion 18 of the gate and mounting bracket 14.

Figure 3:
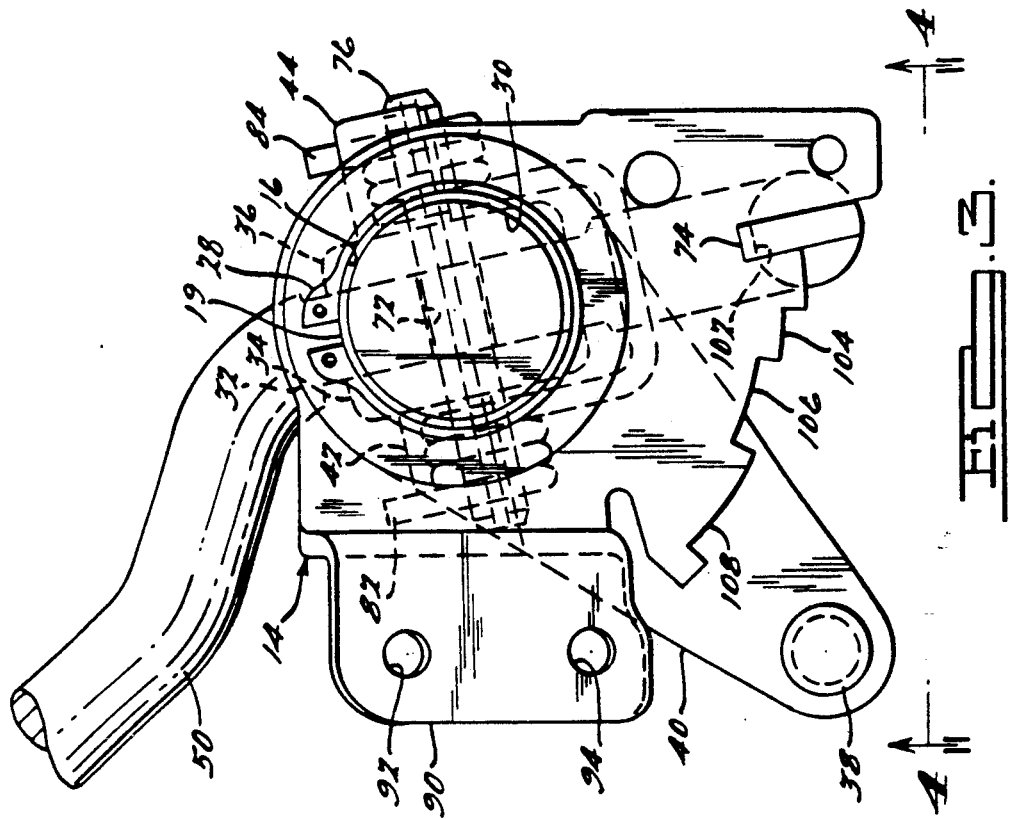
FIG. 3 is a cross-sectional view taken along the plane of the line 3—3 of FIG. 2, and looking in the direction of the arrows.

As shown in FIGS. 3 and 5, the flat terminal end 74 of the shift handle 50 is adapted to extend through the Park detent 102, being retained there by the force of the central U-shaped wire portion 86 of the spring assembly 77.

In operation, manual depression of the hand grip 70 (FIG. 1), against the force of the central U-shaped wire portion 86, serves to lift the flat terminal end 74 laterally out of the Park detent 102. Once free of the inner surface of the planar body portion 18, the hand grip 70 may be rotated to positions adjacent any of the other gate detents 104, 106, or 108, and then relaxed to be urged across same by the force of the spring assembly 77, for a different selected gear shift position. The manual depression and rotation operation is repeated for other selected shift positions.

Industrial Applicability

It should be apparent that the invention provides an improved column-mounted shift control arrangement wherein the gate and mounting bracket is a single stamped component, with the gate being planar and having the shift selecting detents formed on an outer edge thereof. This simplifies design and minimizes cost, and enhances the production of an efficient end product.

While but one embodiment of the invention is shown and described, other modifications thereof are possible within the scope of the following claims.

What is claimed is:

1. A transmission shift control assembly mounted on a vehicle steering column, said assembly comprising a bracket including planar gate and off-set mounting portions, said off-set mounting portion adapted to being secured by suitable fasteners to said steering column, an opening formed through said planar gate portion, a plurality of detents formed along an edge of said planar gate portions, a shift lever unit rotatably mounted through said opening, a shift handle pivotally mounted on said shift lever unit, a terminal end formed on said shift handle adapted to selectively engage said plurality of detents, and resilient means for urging said terminal end into engagement with a selected detent after said terminal end is manually pivoted out of engagement with a detent and said shift lever unit is manually rotated in said opening to a different relative position, wherein said shift lever unit includes a body portion, a hub extended from said body portion through said opening, and a pair of spaced-apart mounting flanges formed on said body portion opposite said hub, said shift handle being pivotally mounted via a pivot pin having opposite ends extended through said flanges, and said resilient means including first and second coil spring portions mounted around said extended ends and having an intermediate portion abutted against said shift handle to urge said terminal end into engagement with a selected detent.

2. The transmission shift control assembly described in claim 1, and a shift cable mounting lug provided on an end portion of said shift lever body portion.

3. The transmission shift control assembly described in claim 1, and first and second spring retainer abutments formed on said shift lever body portion for engagement by straight outer ends of said first and second coil spring portions.

4. The transmission shift control assembly described in claim 1, and retention means operatively connected to the end portion of said hub to retain said bracket in an axial location therealong.

* * * * *